(12) United States Patent
Du (10) Patent No.: US 11,263,926 B2
(45) Date of Patent: Mar. 1, 2022

(54) SUSPENDED GALAXY DEVICE

(71) Applicant: BOE TECHNOLOGY GROUP CO., LTD., Beijing (CN)

(72) Inventor: Zhihong Du, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 313 days.

(21) Appl. No.: 16/606,434

(22) PCT Filed: Apr. 10, 2019

(86) PCT No.: PCT/CN2019/082117
§ 371 (c)(1),
(2) Date: Oct. 18, 2019

(87) PCT Pub. No.: WO2019/218811
PCT Pub. Date: Nov. 21, 2019

(65) Prior Publication Data
US 2021/0407321 A1   Dec. 30, 2021

(30) Foreign Application Priority Data

May 16, 2018 (CN) .......................... 201820731931.2

(51) Int. Cl.
*G09B 27/06* (2006.01)
(52) U.S. Cl.
CPC .................................. *G09B 27/06* (2013.01)
(58) Field of Classification Search
CPC ......... G09B 27/00; G09B 27/02; G09B 27/06
See application file for complete search history.

(56) References Cited

U.S. PATENT DOCUMENTS

| | | | | | |
|---|---|---|---|---|---|
| 72,612 | A | * | 12/1867 | Davis ..................... | G09B 27/02 434/291 |
| 652,545 | A | * | 6/1900 | Mitchell et al. ....... | G09B 27/02 434/291 |
| 749,508 | A | * | 1/1904 | Wesson .................. | G09B 27/02 434/291 |
| 1,286,909 | A | * | 12/1918 | Baker .................... | G09B 27/02 434/291 |

(Continued)

FOREIGN PATENT DOCUMENTS

| CN | 103985310 | 8/2014 |
|---|---|---|
| CN | 106205299 | 12/2016 |

(Continued)

*Primary Examiner* — Kurt Fernstrom
(74) *Attorney, Agent, or Firm* — Leason Ellis LLP (57) ABSTRACT

A suspended galaxy device includes: a drive component, a star component, at least one planet component, and an orbit component. The planet component includes a rotation portion that is transmissively connected to the drive component and rotatable about the star component, a planet holder and a planet model. The orbit component includes at least one annular orbit corresponding to the at least one planet component; and the planet holder is on the rotation portion, and the annular orbit corresponds to a motion track of the planet holder. The planet holder, the annular orbit and the planet model are all magnetic, and are configured such that the planet model is suspended between the planet holder and the annular orbit.

15 Claims, 4 Drawing Sheets

(56) References Cited

U.S. PATENT DOCUMENTS

| | | | | |
|---|---|---|---|---|
| 1,497,150 A * | 6/1924 | Maddux | G09B 27/02 | 434/293 |
| 2,098,296 A * | 11/1937 | La Grasse | G09B 27/02 | 434/291 |
| 2,204,952 A * | 6/1940 | Wittigsehlager | G09B 27/02 | 434/291 |
| 3,029,528 A * | 4/1962 | Verson | G09B 27/02 | 434/291 |
| 3,242,595 A * | 3/1966 | Reyner | G09B 27/02 | 434/291 |
| 3,387,393 A * | 6/1968 | Musser | G09B 27/02 | 434/291 |
| 3,520,073 A * | 7/1970 | Baader | G09B 27/02 | 434/288 |
| 3,733,720 A * | 5/1973 | Byers | G09B 27/02 | 434/291 |
| 3,879,862 A * | 4/1975 | Chin | G09B 27/06 | 434/288 |
| 4,713,011 A * | 12/1987 | Alnafissa | G09B 27/02 | 434/292 |
| 5,695,344 A * | 12/1997 | Tomasello | G09B 23/20 | 434/281 |
| 5,967,791 A * | 10/1999 | Abrahamian | G09B 27/06 | 434/284 |
| 6,565,360 B1 * | 5/2003 | Kavvouras | G09B 27/02 | 434/284 |
| 6,899,448 B2 * | 5/2005 | Damalas | F21S 8/04 | 362/234 |
| 2020/0251019 A1 * | 8/2020 | Rutta | G09B 5/00 | |

FOREIGN PATENT DOCUMENTS

| | | |
|---|---|---|
| CN | 206271315 | 6/2017 |
| CN | 206340270 | 7/2017 |
| CN | 107293209 | 10/2017 |
| CN | 208706141 | 4/2019 |
| JP | 02139591 | 5/1990 |

* cited by examiner

SUSPENDED GALAXY DEVICE

CROSS-REFERENCE TO RELATED PATENT APPLICATIONS

This application is a U.S. National Stage Application under 35 U.S.C. § 371 of International Patent Application No. PCT/CN2019/082117, file Apr. 10, 2019, which claims priority of the Chinese Patent Application No. 201820731931.2, filed on May 16, 2018, the disclosures of which are incorporated herein by reference in their entireties as part of the present application.

TECHNICAL FIELD

The present disclosure relates to a suspended galaxy device.

BACKGROUND

A galaxy demonstration device can help students understand the knowledge of galaxy movement. Students can intuitively feel the movement of celestial bodies, understand the movement laws of celestial bodies, and students' enthusiasm for learning is stimulated.

In the existing galaxy demonstration device, the celestial bodies are connected to the corresponding support members and then driven by the drive device. However, in the real universe, the celestial bodies move in suspension. Therefore, the situation of the simulated celestial body motion in the existing galaxy demonstration device is quite different from the real situation, and the sense of reality is not strong and the interest is low.

SUMMARY

Some embodiments of the present disclosure provide a suspended galaxy device, including: a drive component, a star component, at least one planet component, and an orbit component; the planet component includes a rotation portion that is transmissively connected to the drive component and rotatable about the star component, a planet holder and a planet model; the orbit component includes at least one annular orbit corresponding to the at least one planet component; and the planet holder is on the rotation portion, and the annular orbit corresponds to a motion track of the planet holder; the planet holder, the annular orbit and the planet model are all magnetic, and are configured such that the planet model is suspended between the planet holder and the annular orbit.

In some examples, the star component includes a star model, the rotation portion is further configured to rotate about the star model.

In some examples, in a direction perpendicular to a plane in which the motion track of the planet holder is located, the planet holder, the planet model and the annular orbit are sequentially arranged.

In some examples, the planet model is provided with a first magnet interacting with the planet holder and a second magnet interacting with the annular orbit.

In some examples, the annular orbit is above the planet holder, the first magnet and the second magnet are respectively arranged at a lower position and a higher position along a vertical axis in which a gravity center of the planet model is located, and the gravity center of the planet model is biased toward a side of the first magnet that is arranged at the lower position; or, the annular orbit is below the planet holder, the first magnet and the second magnet are respectively arranged at a higher position and a lower position along a vertical axis of the gravity center of the planet model, and the gravity center of the planet model is biased toward a side of the second magnet that is arranged at the lower position.

In some examples, the drive component includes: a gear set, the gear set includes a power shaft gear and at least one transmission shaft gear; each rotation portion is provided with an internal gear, and each of the at least one transmission shaft gear in the gear set is engaged with the internal gear of a corresponding rotation portion.

In some examples, the gear set includes a power shaft and a transmission shaft that are both vertically disposed, the power shaft gear is fixedly connected to the power shaft, and the transmission shaft gear is fixedly connected to the transmission shaft.

In some examples, the drive component includes: a motor that is transmissively connected to the power shaft gear.

In some examples, the rotation portion includes: a connection rod and the internal gear; one end of the connection rod is connected to the internal gear, and the other end of the connection rod is connected to the planet holder.

In some examples, the star component further includes a star holder; the orbit component further includes a center orbit corresponding to the star holder; the star holder, the center orbit and the star model are all magnetic, and are configured such that the star model is suspended between the star holder and the center orbit.

In some examples, the suspended galaxy device further including a housing, the drive component, the star component and the planet component are all located in the housing; the housing is further provided with a first partition and a second partition spaced apart from each other; both the star model and the planet model are between the first partition and the second partition.

In some examples, the first partition and the second partition divide an interior of the housing into three portions, and a portion of a side wall of the housing between the first partition and the second partition is transparent.

In some examples, the drive component, the star component, and the at least one planet component are on a side of the first partition away from the second partition, the orbit component is on a side of the second partition away from the first partition; or, the drive component, the star component, and the planet component are on the side of the second partition away from the first partition, the orbit component is on the side of the first partition away from the second partition.

In some examples, the first partition is provided with a center groove and at least one annular groove, the center groove corresponds to the star model, the at least one annular groove corresponds to the motion track of the star model.

In some examples, the suspended galaxy device further including a control component including: an electrically connected sensor, a processor and a power supply device; the sensor is configured to detect a change in a magnetic field caused by a change in distance between the planet holder and the planet model, and feed back corresponding change information; the processor is configured to generate and transmit a current compensation command according to the change information; the power supply device is configured to output a compensation current to a coil within the planet holder according to the current compensation command, to adjust the magnetic field between the planet holder and an upper orbit such that the planet model is brought back to a suspended state.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

REFERENCES

1—drive component; 11—gear set of the drive component 1, the reference number 11(1) in the drawings indicates that 11 belongs to 1, the affiliation of similar reference numerals in the drawings is also the same, and will not be described again; 111—power shaft gear of the gear set 11; 112—transmission shaft gear of the gear set 11; 113—power shaft of the gear set 11; 114—transmission shaft of the gear set 11; 12—motor of the drive component 1; 13—first bevel gear; 14—second bevel gear; 2—star component; 21—star model of the star component; 22—star holder of the star component; 3—planet component; 31—planet model of the planet component; 32—rotation portion of the planet component; 321—internal gear of the rotation portion 32; 322—connection rod of the rotation portion 32; 33—planet holder of the planet component; 4—orbit component; 41—annular orbit of the orbit component; 42—center orbit of the orbit component; 5—first magnet; 6—second magnet; 7—housing; 71—lower housing of the housing 7; 72—annular glass shield of the housing 7; 73—upper housing of the housing 7; 8—first partition; 9—second partition; 10—sensor; 20—processor; 30—power supply device.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Those skilled in the art can understand that unless specifically stated, the singular forms "a", "an", "the" used herein can also include the plural. It should be further understood that the phrase "include" or "includes", used in the specification of the present disclosure, refers to that there are such features, integers, steps, operations, elements, and/or components, however, it is not excluded that one or more other features, integers, steps, operations, elements, components, and/or combinations thereof are present. The phrase "and/or" used herein includes all or any one or all combinations of one or more of the associated listed.

Those skilled in the art can understand that unless otherwise defined, all terms (including technical and scientific terms) used herein have the same meaning as commonly understood by one of ordinary skill in the art to which the present disclosure belongs. It should be further understood that terms such as those defined in the general dictionary should be understood to have meaning consistent with the meaning in the context of the prior art, and will not be interpreted in an idealized or overly formal meaning unless specifically defined as herein.

The present disclosure provides a suspended galaxy device, as illustrated in FIGS. 1-3, 8 and 9, including: a drive component 1, a star component 2, at least one planet component 3 and an orbit component 4.

The star component 2 includes a star model 21. The planet component 3 includes a rotation portion 32 that is transmissively connected to the drive component 1 and rotatable about the star component 2, a planet holder 33 and a planet model 31. The orbit component 4 includes at least one annular orbit 41 corresponding to the at least one planet component 3.

The planet holder 33 is disposed on the rotation portion 32, and the annular orbit 41 corresponds to a motion track of the planet holder 33; the planet holder 33, the annular orbit 41 and the planet model 31 are all magnetic such that the planet model 31 is suspended between the planet holder 33 and the annular orbit 41.

The drive component 1 drives the rotation portion 32 to rotate about the star model 21, thereby causing the planet holder 33 on the rotation portion 32 to rotate. Driven by the magnetic force between the planet holder 33 and the planet model 31, the planet model 31 also rotates with the planet holder 33, thus, the planet model 31 is rotated about the star model 21 in a suspended state, and the suspended galaxy device is closer to the situation of the celestial bodies in the universe, and has a strong sense of reality and high interest.

Figure 1:
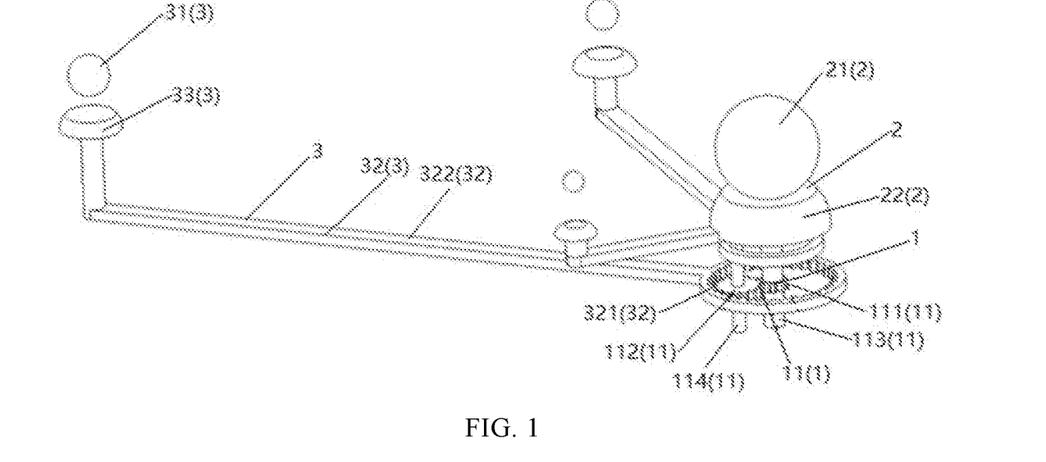
FIG. 1 is a schematic diagram showing an assembly structure of a star component and a planet component according to an embodiment of the present disclosure.
Figure 2:
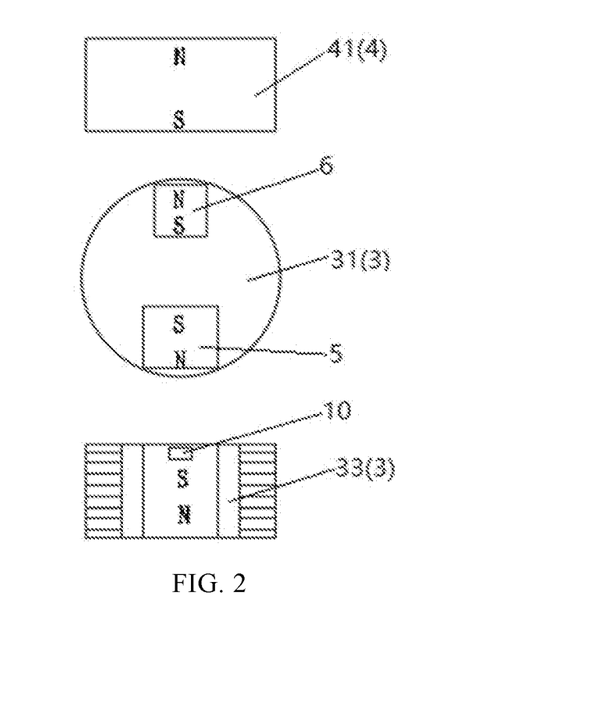
FIG. 2 is a schematic diagram showing a position relationship of an annular orbit, a planet model and a planet holder according to the embodiment of the present disclosure.
Figure 3:
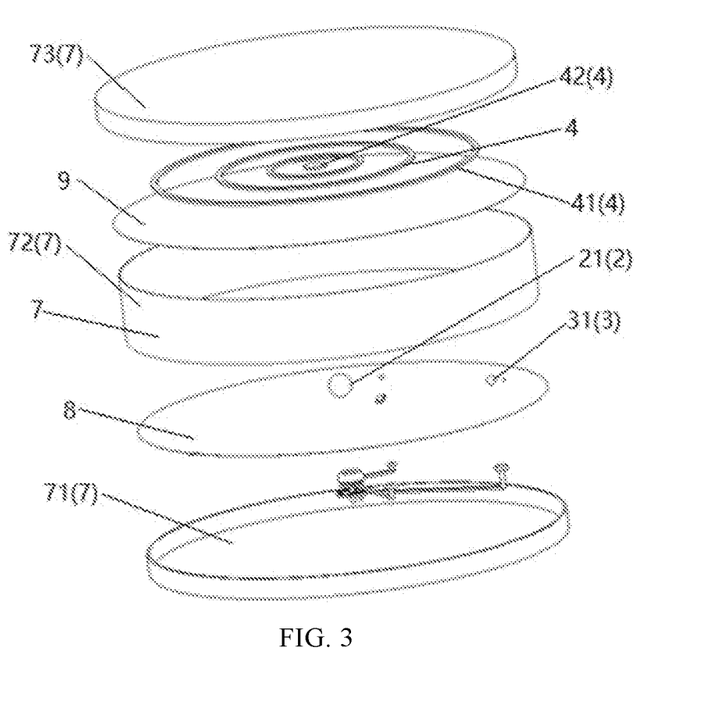
FIG. 3 is a schematic diagram showing a structure of a suspended galaxy device according to the embodiment of the present disclosure.

Some embodiments of the present disclosure provide a suspended galaxy device, as illustrated in FIGS. 1-3, including: a drive component 1, a star component 2, at least one planet component 3 and an orbit component 4.

The star component 2 includes a star model 21. The planet component 3 includes a rotation portion 32 that is transmissively connected to the drive component 1 and rotatable about the star component 21, a planet holder 33 and a planet model 31. The orbit component 4 includes at least one annular orbit 41 corresponding to the at least one planet component 3.

The planet holder 33 is disposed on the rotation portion 32, the annular orbit 41 is located above the planet holder 33, and the annular orbit 41 corresponds to a motion track of the planet holder 33; the planet holder 33, the annular orbit 41 and the planet model 31 are all magnetic. For example, the annular orbit 41 and the planet model 31 are attracted to each other, and the planet holder 33 and the planet model 31 are attracted to each other too, the attraction between the annular orbit 41 and the planet model 31 suspends the planet model 31, and the attraction between the planet holder 33 and the planet model 31 allows the planet model 31 to rotate with the planet holder 33.

For example, in a direction perpendicular to a plane in which the motion track of the planet holder 33 is located, the planet holder 33, the planet model 31 and the annular orbit 41 are sequentially arranged. For example, the motion track of the planet holder 33 is a circle, and the plane in which the motion track of the planet holder 31 is located is the plane in which the circle is located.

The drive component 1 drives the rotation portion 32 to rotate about the star model 21, thereby causing the planet holder 33 on the rotation portion 32 to rotate. Driven by the magnetic force between the planet holder 33 and the planet model 31, the planet model 31 also rotates with the planet holder 33, thus, the planet model 31 is rotated about the star model 21 in a suspended state, and the suspended galaxy device is closer to the situation of the celestial bodies in the universe, and has a strong sense of reality and high interest.

In the suspended galaxy device according to the above embodiment, there are a plurality of planet components 3. The orbit component 4 includes a plurality of annular orbits 41, and the plurality of annular orbits 41 are sequentially nested from the inside to the outside, so that a celestial system having a plurality of planets can be simulated.

For example, the planet model 31 is provided with a first magnet 5 interacting with the planet holder 33 and a second magnet 6 interacting with the annular orbit 41.

For example, in some embodiments of the present disclosure, as illustrated in FIG. 2, the annular orbit 41 is above the planet holder 33, the first magnet 5 and the second magnet 6 are respectively arranged at a lower position and a higher position along a vertical axis in which a gravity center of the planet model 31 is located, and the gravity center of the planet model 31 is biased toward a side of the first magnet 5 that is arranged at the lower position.

In some embodiments of the present disclosure, the gravity of the planet model 31 is always biased toward the side of the magnet that is arranged at the lower position, and under the action of gravity, the first magnet 5 and the second magnet 6 in the planet model 31 can quickly return to the position state respectively opposite to the planet holder 33 and the annular orbit 41, so that the planet model 31 is quickly adjusted to an equilibrium state.

As illustrated in FIG. 2, when the planet model 31 is in equilibrium, the first magnet 5 is located below the planet model 31 and is opposite to the planet holder 33, and the second magnet 6 is located above the planet model 31 and is opposite to the annular orbit 41. The planet model 31 is disturbed during the suspension to revolve on its own axis, so that the orientation form the first magnet 5 to the planet holder 33 changes, and the orientation from the second magnet 6 to the annular orbit 41 changes, and the equilibrium state of the planet model 31 is destroyed. Because the gravity center of the planet model 31 is biased toward the side of the first magnet 5 located at the lower position, at this time, under the action of the gravity of the planet model 31 itself, the planet model 31 quickly returns to the original orientation relationship, so that the first magnet 5 is located below the planet model 31, the second magnet 6 is located above the planet model 31, and the planet model 31 returns to the equilibrium state.

There are a plurality of manners in which the gravity center of the planet model 31 is always biased toward the side of the magnet at the lower position. In some embodiments of the present disclosure, the weights of the first magnet 5 and the second magnet 6 are different, as illustrated in FIG. 2, the first magnet 5 and the second magnet 6 are respectively arranged at a lower position and a higher position along a vertical axis in which the gravity center of the planet model 31 is located, and the weight of the first magnet 5 is larger than that of the second magnet 6, so that the gravity center of the planet model 31 is biased toward the side of the magnet at the lower position. Of course, it is also possible to add other weights on the side of the magnet at the lower position of the planet model 31, so that the gravity center of the planet model 31 is biased toward this side; or, the upper and lower sides of the planet model 31 are made of materials of different densities, so that the gravity center of the planet model 31 is biased toward the side of the magnet at the lower position.

For example, the drive component 1 provided by some embodiments of the present disclosure includes: a gear set 11, the gear set 11 includes a power shaft gear 111 and at least one transmission shaft gear 112. The power shaft gear 111 can engage with the transmission shaft gear 112 through a plurality of gears, or can directly engage with the transmission shaft gear 112. Each rotation portion 32 is provided with an internal gear 321, and the internal gear 321 of each rotation portion 32 is engaged with each of the at least one transmission shaft gear 112 in the gear set 11.

In the suspended galaxy device provided by embodiment one of the present disclosure, there are a plurality of planet components 3, so that there are a plurality of planet models 31, and the revolution period of each planet model 31 around the star model 21 may be different. In one embodiment of the present disclosure, by changing the gear ratio of a set of a transmission shaft gear 112 and an internal gear 321 that are engaged with each other, the angular velocity of the corresponding planet model 31 can be changed, thereby the revolution period of the planet model 31 is changed, and finally each planet model 31 has a corresponding revolution period.

For example, the gear set 11 provided by some embodiments of the present disclosure includes a power shaft 113 and a transmission shaft 114 that are both vertically disposed, the power shaft gear 111 is fixedly connected to the power shaft 113, and the transmission shaft gear 112 is fixedly connected to the transmission shaft 114. For example, in some embodiments of the present disclosure, a plurality of transmission shaft gears 112 can be fixed along an axial direction of a transmission shaft 114, the power shaft gear 111 only needs to engage with one of the transmission shaft gears 112, so that the plurality of transmission shaft gears 112 can be rotated at the same time. Correspondingly, a plurality of rotation portions 32 are arranged along an axial direction of a power shaft 113, and the internal gear 321 of each rotation portion 32 is engaged with the corresponding transmission shaft gear 112.

For example, the rotation portion 32 provided by some embodiments of the present disclosure includes: a connection rod 322 and the internal gear 321. One end of the connection rod 322 is connected to the internal gear 321, and the other end of the connection rod 322 is connected to the planet holder 33.

Figure 4:
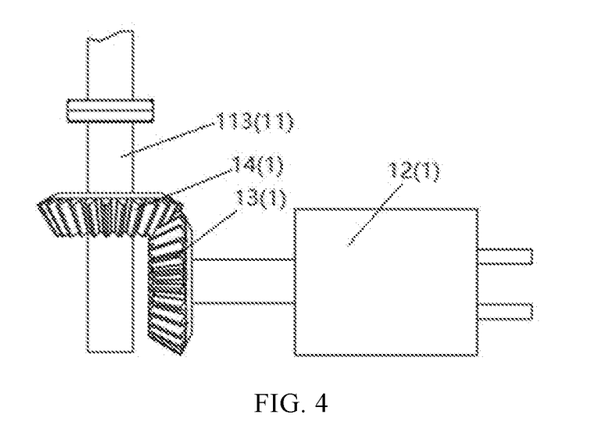
FIG. 4 is a schematic diagram showing an assembly structure of a motor and a power shaft according to the embodiment of the present disclosure.

For example, the drive component 1 provided by some embodiments of the present disclosure includes: a motor 12 that is transmissively connected to the power shaft gear 111. For example, in some embodiments of the present disclosure, as illustrated in FIG. 4, the output shaft of the motor 12 is fixed with a first bevel gear 13, the power shaft 113 is fixed with a second bevel gear 14, and the first bevel gear 13 and the second bevel gear 14 are engaged with each other to realize a transmission connection of the motor 12 to the power shaft gear 111.

For example, the star component 2 provided by some embodiments of the present disclosure further includes a star holder 22. The orbit component 4 further includes a center orbit 42 corresponding to the star holder 22. The star holder 22, the center orbit 42 and the star model 21 are all magnetic, so that the star model 21 is suspended between the star holder 22 and the center orbit 42.

For example, in some embodiments of the present disclosure, the center orbit 42 and the star model 21 are attracted to each other, and the star holder 22 and the star model 21 are attracted to each other too. Or, the center orbit 42 and the star model 21 are attracted to each other, and the star holder 22 and the star model 21 are repelled from each other.

For example, the star model 21 is provided with the first magnet 5 interacting with the star holder 22, and the second magnet 6 interacting with the center orbit 42. For example, in some embodiments of the present disclosure, the center orbit 42 is located above the star holder 22, the first magnet 5 and the second magnet 6 are respectively arranged at a lower position and a higher position along a vertical axis in which a gravity center of the star model 21 is located, and the gravity center of the star model 21 is biased toward a side of the first magnet 5 that is arranged at the lower position.

For example, the suspended galaxy device provided by some embodiments of the present disclosure further includes a housing 7, as illustrated in FIG. 3, the drive component 1, the star component 2 and the planet component 3 are all located in the housing 7.

The housing 7 includes a lower housing 71, an annular glass shield 72 and an upper housing 73, and the three enclose a closed space. The housing 7 is further provided with a first partition 8 and a second partition 9 that is disposed above the first partition 8, and both the star model 21 and the planet model 31 are located between the first partition 8 and the second partition 9. For example, the first partition 8 and the second partition 9 are respectively located at the upper and lower sides of the annular glass shield 72. For the observer, only the star model 21 and the planet model 31 suspended in the space between the first partition 8 and the second partition 9 can be seen through the annular glass cover 72, the sense of reality of the simulation is further enhanced.

For example, for the entire housing 7, the first partition 8 and the second partition 9 divide the interior of the housing 7 into three portions, and the portion of the side wall of the housing 7 between the first partition 8 and the second partition 9 is transparent. Therefore, the suspended state of the planet model between the first partition and the second partition is seen by the observer.

For example, the drive component 1, the star component 2, and the at least one planet component 3 are on a side of the first partition 8 away from the second partition 9, and the orbit component 4 is on a side of the second partition away from the first partition 8. For example, a portion of the housing 7 on the outside of the first partition 8 and the second partition 9 can be opaque, so that the drive component 1, the star component 2, the at least one planet component 3 and the orbit component 4 can be hided or be partially hided, and the sense of reality of observation is enhanced.

For example, in some embodiments of the present disclosure, as illustrated in FIG. 3, the star holder 22 and the planet holder 33 are located below the first partition 8, and disposed inside the space between the lower housing 71 and the first partition 8; the annular orbit 41 and a gravity portion are located above the second partition 9, and disposed inside the space between the upper housing 73 and the second partition 9.

Figure 5:
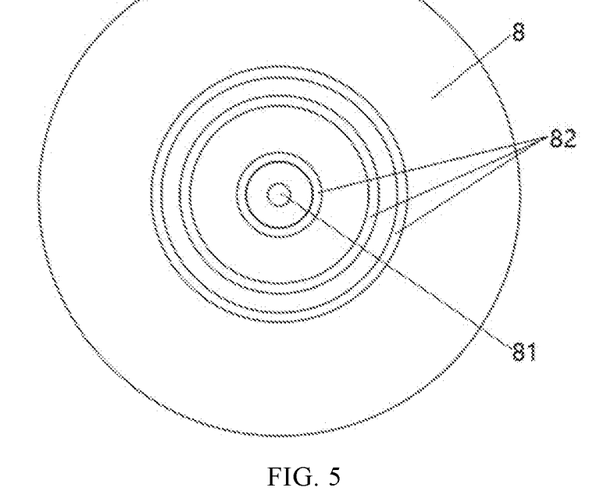
FIG. 5 is a schematic diagram showing a structure of a first partition according to the embodiment of the present disclosure.
Figure 6:
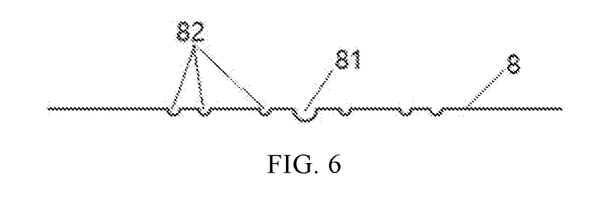
FIG. 6 is a radial section view of a first partition according to the embodiment of the present disclosure.

For example, as illustrated in FIG. 5 and FIG. 6, the first partition 8 is provided with a center groove 81 and at least one annular groove 82, the center groove 81 corresponds to the star model 21, the at least one annular groove 82 corresponds to the motion track of the planet model 31. When the suspended galaxy device is stopped, the suspended state of the star model 21 and the planet model 31 is terminated, and the star model 21 can fall into the center groove 81, and the planet model 31 can fall into the corresponding annular groove 82. For example, in some embodiments of the present disclosure, there are a plurality of annular grooves 82, and the plurality of annular grooves 82 are sequentially nested from the inside to the outside, and each annular groove 82 corresponds to a planet model 31.

For example, in some embodiments of the present disclosure, each annular groove 82 can be provided with at least one concave pit that is at intervals. When the suspended galaxy device is stopped, the planet model 31 falls into the corresponding annular groove 82, and then moves into a certain concave pit, so that the position of the planet model 31 is finally fixed to prevent the planet model 31 from freely moving within the annular groove 82. Of course, if when the suspended galaxy device is stopped, the planet model 31 is just above a certain concave pit of the corresponding annular groove 82, the planet model 31 can also directly fall into the concave pit.

Figure 7:
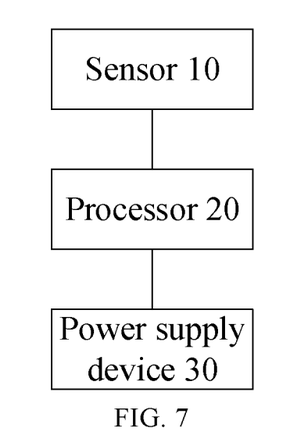
FIG. 7 is a schematic diagram showing a module of a control component according to the embodiment of the present disclosure.

For example, the suspended galaxy device provided by some embodiments of the present disclosure further includes a control component, as illustrated in FIG. 7, the control component includes: an electrically connected sensor 10, a processor 20 and a power supply device 30.

The sensor 10 is configured to detect a change in a magnetic field caused by a change in distance between the planet holder 33 and the planet model 31, and feed back corresponding change information.

The processor 20 is configured to generate and transmit a current compensation command according to the change information.

The power supply device 30 is configured to output a compensation current to a coil within the planet holder 33 according to the current compensation command, to adjust the magnetic field between the planet holder 33 and an upper orbit such that the planet model 31 is brought back to a suspended state.

When the planet model deviates from the equilibrium position, the distance between the planet holder 33 and the planet model 31 changes, causing a change in the magnetic field between the planet holder 33 and the planet model 31, the sensor 10 can detect the change in the magnetic field and feed back corresponding information to the processor 20, the processor 20 generates and transmits a current compensation command to the power supply device 30 according to the change information, the power supply device 30 outputs a compensation current to a coil within the planet holder 33 according to the current compensation command, to adjust the magnetic field between the planet holder 33 and an upper orbit such that the planet model 31 is brought back to a suspended state.

For example, in some embodiments of the present disclosure, the sensor 10 is a Hall sensor.

Some other embodiments of the present disclosure further provide a suspended galaxy device, and only the differences from the above embodiments will be mainly described below, and the description of the same points will be omitted.

Figure 8:
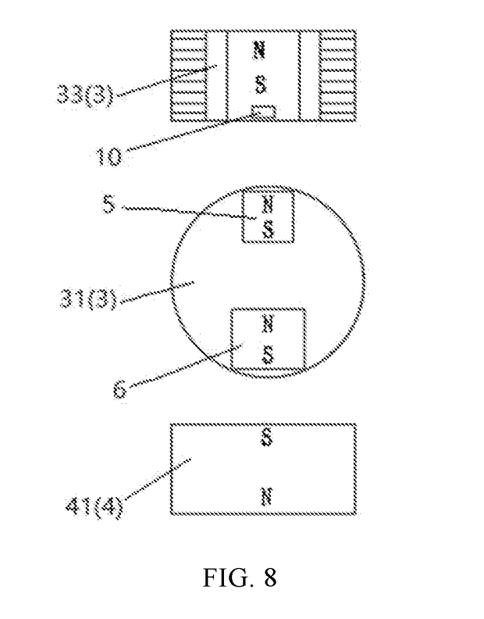
FIG. 8 is a schematic diagram showing a position relationship of an annular orbit, a planet model and a planet holder according to another embodiment of the present disclosure.
Figure 9:
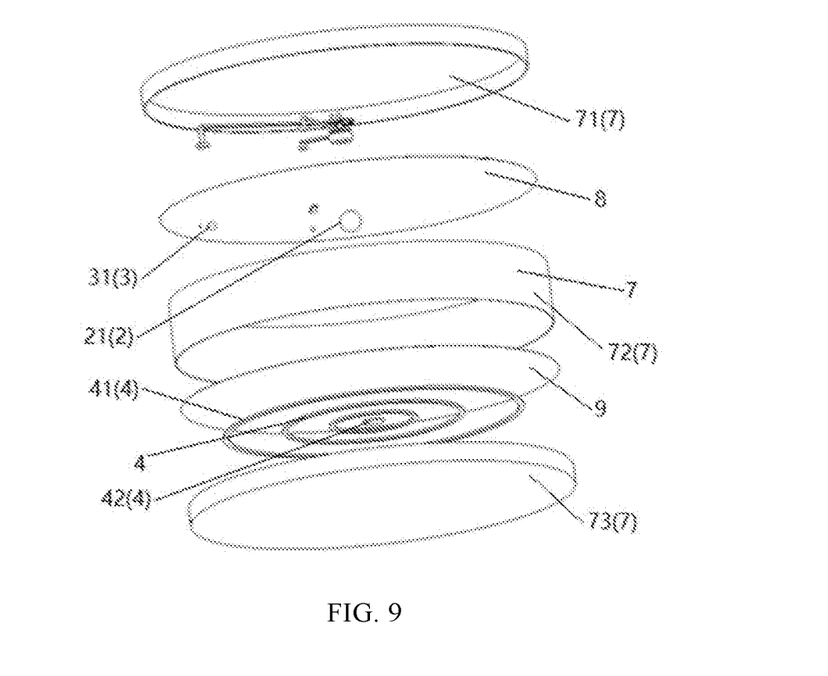
FIG. 9 is a schematic diagram showing a structure of a suspended galaxy device according to another embodiment of the present disclosure.

As illustrated in FIG. 8 and FIG. 9, the annular orbit 41 is located below the planet holder 33, the annular orbit 41 and the planet model 31 are repelled from each other, and the planet holder 33 and the planet model 31 are attracted to each other. The repelling force between the annular orbit 41 and the planet model 31 suspends the planet model 31, and the attraction between the planet holder 33 and the planet model 31 allows the planet model 31 to rotate with the planet holder 33. In the suspended galaxy device illustrated in FIG. 8 and FIG. 9, compared with the above embodiments, the annular orbit 41, the planet model 31, and the planet holder 33 is arranged in the reverse order.

For example, in the embodiments of the present disclosure, "upper" or "above" refers to the direction away from the ground when the suspended galaxy device is placed on a level ground, and "lower" or "below" refers to the direction near the ground when the suspended galaxy device is placed on the level ground.

For example, in some embodiments of the present disclosure, as illustrated in FIG. 8, in the planet model 31, the first magnet 5 and the second magnet 6 are respectively arranged at a higher position and a lower position along a vertical axis in which the gravity center of the planet model 31 is located, the first magnet 5 and the planet holder 33 are attracted to each other, and the second magnet 6 and the annular orbit 41 are repelled from each other, and the gravity center of the planet model 31 is biased toward the side of the second magnet 6 that is arranged at the lower position. For example, the weight of the second magnet 6 is larger than that of the first magnet 5, so that the gravity center of the planet model 31 is biased toward the side of the magnet that is arranged at the lower position.

For example, as illustrated in FIG. 9, the star holder 22 and the planet holder 33 are located above the second partition 9, and disposed inside the space between the upper housing 73 and the second partition 9; the annular orbit 41 and the gravity portion are located below the first partition 8, and disposed inside the space between the lower housing 71 and the first partition 8.

For example, the drive component 1, the star component 2, and the at least one planet component 3 are disposed on a side of the second partition 9 away from the first partition 8, and the orbit component 4 is disposed on a side of the first partition 8 away from the second partition 9.

The drive component provided by the embodiments of the present disclosure drives the rotation portion to rotate about the star model, thereby causing the planet holder on the rotation portion to rotate. Driven by the magnetic force between the planet holder and the planet model, the planet model also rotates with the planet holder, thus, the planet model is rotated about the star model in a suspended state, and the suspended galaxy device is closer to the situation of the celestial bodies in the universe, and has a strong sense of reality and high interest.

The gravity center of the planet model provided by the embodiments of the present disclosure is always biased toward the side of the magnet that is arranged at the lower position, and under the action of gravity, the first magnet and the second magnet in the planet model can quickly return to the position state respectively opposite to the planet holder and the annular orbit, so that the planet model is quickly adjusted to an equilibrium state.

In the suspended galaxy device provided by the embodiments of the present disclosure, it is possible that there are a plurality of planet components, so that there are a plurality of planet models, and the revolution period of each planet model around the star model may be different. By changing the gear ratio of a set of a transmission shaft gear and an internal gear that are engaged with each other, the angular velocity of the corresponding planet model can be changed, thereby the revolution period of the planet model is changed, and finally each planet model has a corresponding revolution period.

The suspended galaxy device provided by the embodiments of the present disclosure further includes the housing, the housing is further provided with a first partition and a second partition that is disposed above the first partition, the first partition and the second partition are respectively located at the upper and lower sides of the annular glass shield, and the star model and the planet model are located between the first partition and the second partition. For the observer, only the star model and the planet model suspended in the space between the first partition and the second partition can be seen through the annular glass cover, so that the sense of reality of the simulation is further enhanced.

What have been described above are only exemplary implementations of the present disclosure, and is not intended to limit the protection scope of the present disclosure, and the protection scope of the present disclosure is determined by the appended claims.

What is claimed is:

1. A suspended galaxy device, comprising: a drive component, a star component, at least one planet component, and an orbit component, wherein
   the planet component comprises a rotation portion that is transmissively connected to the drive component and rotatable about the star component, and a planet holder and a planet model;
   the orbit component comprises at least one annular orbit corresponding to the at least one planet component; and
   the planet holder is on the rotation portion, and the annular orbit corresponds to a motion track of the planet holder; the planet holder, the annular orbit and the planet model are all magnetic, and are all configured such that the planet model is suspended between the planet holder and the annular orbit.

2. The suspended galaxy device according to claim 1, wherein the star component comprises a star model, the rotation portion is further configured to rotate about the star model.

3. The suspended galaxy device according to claim 1, wherein, in a direction perpendicular to a plane in which the motion track of the planet holder is located, the planet holder, the planet model and the annular orbit are sequentially arranged.

4. The suspended galaxy device according to claim 1, wherein the planet model is provided with a first magnet interacting with the planet holder and a second magnet interacting with the annular orbit.

5. The suspended galaxy device according to claim 4, wherein the annular orbit is above the planet holder, the first magnet and the second magnet are respectively arranged at a lower position and a higher position along a vertical axis in which a gravity center of the planet model is located, and the gravity center of the planet model is biased toward a side of the first magnet that is arranged at the lower position; or the annular orbit is below the planet holder, the first magnet and the second magnet are respectively arranged at a higher position and a lower position along a vertical axis in which the gravity center of the planet model is located, and the gravity center of the planet model is biased toward a side of the second magnet that is arranged at the lower position.

6. The suspended galaxy device according to claim 1, wherein the drive component comprises: a gear set, the gear set comprises a power shaft gear and at least one transmission shaft gear; each rotation portion is provided with an internal gear, and each of the at least one transmission shaft gear in the gear set is engaged with the internal gear of a corresponding rotation portion.

7. The suspended galaxy device according to claim 6, wherein the gear set comprises a power shaft and a transmission shaft that are both vertically disposed, the power shaft gear is fixedly connected to the power shaft, and the transmission shaft gear is fixedly connected to the transmission shaft.

8. The suspended galaxy device according to claim 6, wherein the drive component comprises: a motor that is transmissively connected to the power shaft gear.

9. The suspended galaxy device according to claim 6, wherein the rotation portion comprises: a connection rod and the internal gear; one end of the connection rod is connected to the internal gear, and the other end of the connection rod is connected to the planet holder.

10. The suspended galaxy device according to claim 2, wherein the star component further comprises a star holder; the orbit component further comprises a center orbit corresponding to the star holder; the star holder, the center orbit and the star model are all magnetic, and are configured such that the star model is suspended between the star holder and the center orbit.

11. The suspended galaxy device according to claim 10, further comprising a housing, the drive component, the star component and the planet component are all located in the housing;

the housing is further provided with a first partition and a second partition spaced apart from each other;

both the star model and the planet model are between the first partition and the second partition.

12. The suspended galaxy device according to claim 11, wherein the first partition and the second partition divide an interior of the housing into three portions, and a portion of a side wall of the housing between the first partition and the second partition is transparent.

13. The suspended galaxy device according to claim 12, wherein the drive component, the star component, and the at least one planet component are on a side of the first partition away from the second partition, the orbit component is on a side of the second partition away from the first partition; or the drive component, the star component, and the planet component are on the side of the second partition away from the first partition, the orbit component is on the side of the first partition away from the second partition.

14. The suspended galaxy device according to claim 11, wherein the first partition is provided with a center groove and at least one annular groove, the center groove corresponds to the star model, the at least one annular groove corresponds to the motion track of the star model.

15. The suspended galaxy device according to claim 1, further comprising a control component, comprising: an electrically connected sensor, a processor and a power supply device, wherein the sensor is configured to detect a change in a magnetic field caused by a change in distance between the planet holder and the planet model, and feed back corresponding change information;

the processor is configured to generate and transmit a current compensation command according to the change information; and the power supply device is configured to output a compensation current to a coil within the planet holder according to the current compensation command, to adjust the magnetic field between the planet holder and the annular orbit such that the planet model is brought back to a suspended state.

\* \* \* \* \*